(12) United States Patent
Hum

(10) Patent No.: US 6,590,492 B1
(45) Date of Patent: Jul. 8, 2003

(54) PAGER HAVING CUSTOMIZED PAGE ALERT

(76) Inventor: Edward J. Hum, 1461 East 63rd Avenue, Vancouver, BC (CA), V5P 2L6

(*) Notice: Subject to any disclaimer, the term of this patent is extended or adjusted under 35 U.S.C. 154(b) by 0 days.

(21) Appl. No.: 09/410,324

(22) Filed: Oct. 1, 1999

(51) Int. Cl.$^7$ ................................................. H04Q 7/00
(52) U.S. Cl. ...................... 340/7.1; 340/7.51; 340/7.52; 340/7.53; 340/7.57; 340/7.62; 340/311.2
(58) Field of Search ................................ 340/7.1, 7.51, 340/7.52, 7.53, 7.21, 7.55, 7.57, 7.58, 7.62, 7.61, 7.59, 311.2

(56) References Cited

U.S. PATENT DOCUMENTS

| | | | |
|---|---|---|---|
| 4,352,091 A | | 9/1982 | Yamasaki |
| 4,419,668 A | | 12/1983 | Ganucheau, Jr. |
| 4,704,608 A | | 11/1987 | Sato et al. |
| 5,463,368 A | | 10/1995 | Tsunoda et al. |
| 5,465,086 A | * | 11/1995 | Gleeson et al. ............ 340/7.58 |
| 5,721,537 A | | 2/1998 | Protas |
| D396,466 S | | 7/1998 | Sibbitt |
| 5,821,874 A | * | 10/1998 | Parvulescu et al. ........ 340/7.22 |
| 5,969,636 A | * | 10/1999 | Parvulescu et al. ........ 340/7.53 |
| 6,388,560 B1 | * | 5/2002 | Parvulescu et al. ........ 340/7.51 |

* cited by examiner

Primary Examiner—Nina Tong

(57) ABSTRACT

A pager having customized page alert for customizing messages when a page is received. The pager having customized page alert includes a housing having a substantially rectangular configuration. The housing has a top surface and a bottom surface, a peripheral wall extending between a periphery of the top surface and a periphery of the bottom surface. The peripheral wall, the top surface and the bottom surface define an interior space of the housing. A display screen is coupled to the top surface of the housing. The display screen is for displaying a visual representation signal. A speaker and a microphone are mounted within the interior space of the housing. A receiving means is operationally coupled to a processing means. The receiving means is adapted for receiving the signal from the tower. The receiving means and the processing means are mounted within the interior space of the housing. The processing means is operationally coupled to the display screen. The processing means is adapted for converting the signal into the visual representation signal and transmitting the visual representation signal to the display screen. A message playback means is operationally coupled to the processing means. The message playback means is for transmitting a message signal to the processing means upon receipt of the signal from the tower. The speaker is for audibly transmitting the message signal upon transmission of the message signal.

6 Claims, 2 Drawing Sheets

PAGER HAVING CUSTOMIZED PAGE ALERT

BACKGROUND OF THE INVENTION

1. Field of the Invention

The present invention relates to pagers and more particularly pertains to a new pager having customized page alert for customizing messages when a page is received.

2. Description of the Prior Art

The use of pagers is known in the prior art. More specifically, pagers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,419,668; 4,704,608; 5,721,537; 5,468,368; 4,352,091; and U.S. Pat. No. Des. 396,466.

While these devices fulfill their respective, particular objectives and requirements, the aforementioned patents do not disclose a new pager having customized page alert. The inventive device includes a housing having a substantially rectangular configuration. The housing has a top surface and a bottom surface, a peripheral wall extending between a periphery of the top surface and a periphery of the bottom surface. The peripheral wall, the top surface and the bottom surface define an interior space of the housing. A display screen is coupled to the top surface of the housing. The display screen is for displaying a visual representation signal. A speaker and a microphone are mounted within the interior space of the housing. A receiving means is operationally coupled to a processing means. The receiving means is adapted for receiving the signal from the tower. The receiving means and the processing means are mounted within the interior space of the housing. The processing means is operationally coupled to the display screen. The processing means is adapted for converting the signal into the visual representation signal and transmitting the visual representation signal to the display screen. A message playback means is operationally coupled to the processing means. The message playback means is for transmitting a message signal to the processing means upon receipt of the signal from the tower. The speaker is for audibly transmitting the message signal upon transmission of the message signal.

In these respects, the pager having customized page alert according to the present invention substantially departs from the conventional concepts and designs of the prior art, and in so doing provides an apparatus primarily developed for the purpose of customizing messages when a page is received.

SUMMARY OF THE INVENTION

In view of the foregoing disadvantages inherent in the known types of pagers now present in the prior art, the present invention provides a new pager having customized page alert construction wherein the same can be utilized for customizing messages when a page is received.

The general purpose of the present invention, which will be described subsequently in greater detail, is to provide a new pager having customized page alert apparatus and method which has many of the advantages of the pagers mentioned heretofore and many novel features that result in a new pager having customized page alert which is not anticipated, rendered obvious, suggested, or even implied by any of the prior art pagers, either alone or in any combination thereof.

To attain this, the present invention generally comprises a housing having a substantially rectangular configuration. The housing has a top surface and a bottom surface, a peripheral wall extending between a periphery of the top surface and a periphery of the bottom surface. The peripheral wall, the top surface and the bottom surface define an interior space of the housing. A display screen is coupled to the top surface of the housing. The display screen is for displaying a visual representation signal. A speaker and a microphone are mounted within the interior space of the housing. A receiving means is operationally coupled to a processing means. The receiving means is adapted for receiving the signal from the tower. The receiving means and the processing means are mounted within the interior space of the housing. The processing means is operationally coupled to the display screen. The processing means is adapted for converting the signal into the visual representation signal and transmitting the visual representation signal to the display screen. A message playback means is operationally coupled to the processing means. The message playback means is for transmitting a message signal to the processing means upon receipt of the signal from the tower. The speaker is for audibly transmitting the message signal upon transmission of the message signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pager having customized page alert apparatus and method which has many of the advantages of the pagers mentioned heretofore and many novel features that result in a new pager having customized page alert which is not anticipated, rendered obvious, suggested, or even implied by any of the prior art pagers, either alone or in any combination thereof.

It is another object of the present invention to provide a new pager having customized page alert which may be easily and efficiently manufactured and marketed.

It is a further object of the present invention to provide a new pager having customized page alert which is of a durable and reliable construction.

An even further object of the present invention is to provide a new pager having customized page alert which is susceptible of a low cost of manufacture with regard to both materials and labor, and which accordingly is then susceptible of low prices of sale to the consuming public, thereby making such pager having customized page alert economically available to the buying public.

Still yet another object of the present invention is to provide a new pager having customized page alert which provides in the apparatuses and methods of the prior art some of the advantages thereof, while simultaneously overcoming some of the disadvantages normally associated therewith.

Still another object of the present invention is to provide a new pager having customized page alert for customizing messages when a page is received.

Yet another object of the present invention is to provide a new pager having customized page alert which includes a housing having a substantially rectangular configuration. The housing has a top surface and a bottom surface, a peripheral wall extending between a periphery of the top surface and a periphery of the bottom surface. The peripheral wall, the top surface and the bottom surface define an interior space of the housing. A display screen is coupled to the top surface of the housing. The display screen is for displaying a visual representation signal. A speaker and a microphone are mounted within the interior space of the housing. A receiving means is operationally coupled to a processing means. The receiving means is adapted for receiving the signal from the tower. The receiving means and the processing means are mounted within the interior space of the housing. The processing means is operationally coupled to the display screen. The processing means is adapted for converting the signal into the visual representation signal and transmitting the visual representation signal to the display screen. A message playback means is operationally coupled to the processing means. The message playback means is for transmitting a message signal to the processing means upon receipt of the signal from the tower. The speaker is for audibly transmitting the message signal upon transmission of the message signal.

Still yet another object of the present invention is to provide a new pager having customized page alert that allows a user to select a custom message that will alert the user when a page is received.

Even still another object of the present invention is to provide a new pager having customized page alert that allow a user to record their own messages that they can select to alert them when a page is received.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
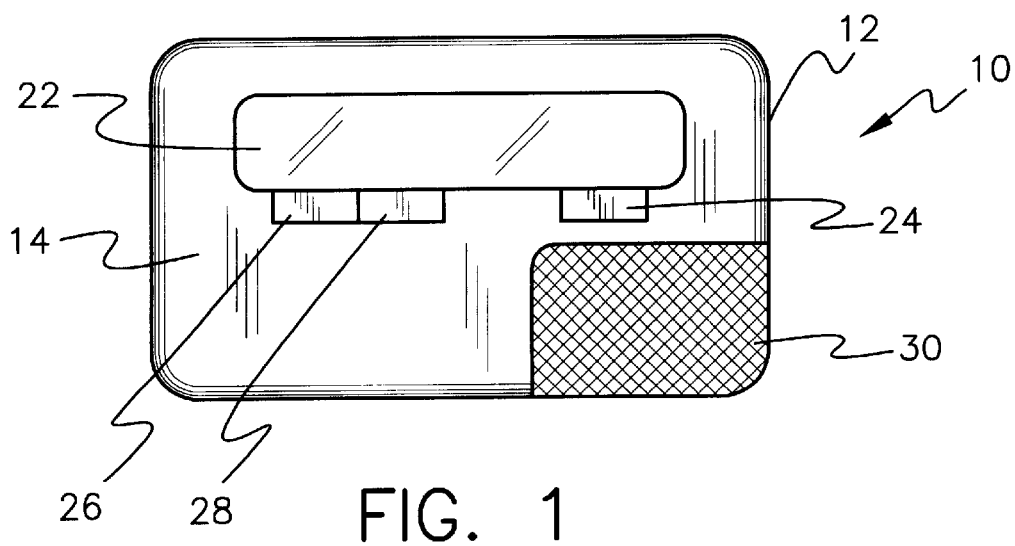
FIG. 1 is a front elevation view of a new pager having customized page alert according to the present invention.

With reference now to the drawings, and in particular to FIGS. 1 through 4 thereof, a new pager having customized page alert embodying the principles and concepts of the present invention and generally designated by the reference numeral 10 will be described.

As best illustrated in FIGS. 1 through 4, the pager having customized page alert 10 generally comprises a housing 12 having a substantially rectangular configuration. The housing has a top surface 14 and a bottom surface 16. A peripheral wall 18 extends between a periphery of the top surface and a periphery of the bottom surface. The peripheral wall, the top surface and the bottom surface define an interior space of the housing. The peripheral wall has a front portion 20 and a pair of side portions.

A display screen 22 is coupled to the top surface of the housing. The display screen is for displaying a visual representation signal.

A light button 24 is coupled to the top surface of the housing. The light button is operationally coupled to the display screen such that the display screen is illuminated upon depression of the light button.

As shown in FIG. 1, a scrolling button 26 is coupled to the top surface of the housing such that the scrolling button is positioned proximate the display screen. A selection button 28 is coupled to the top surface of the housing such that the selection button is positioned proximate the display screen and the scrolling button.

Figure 2:
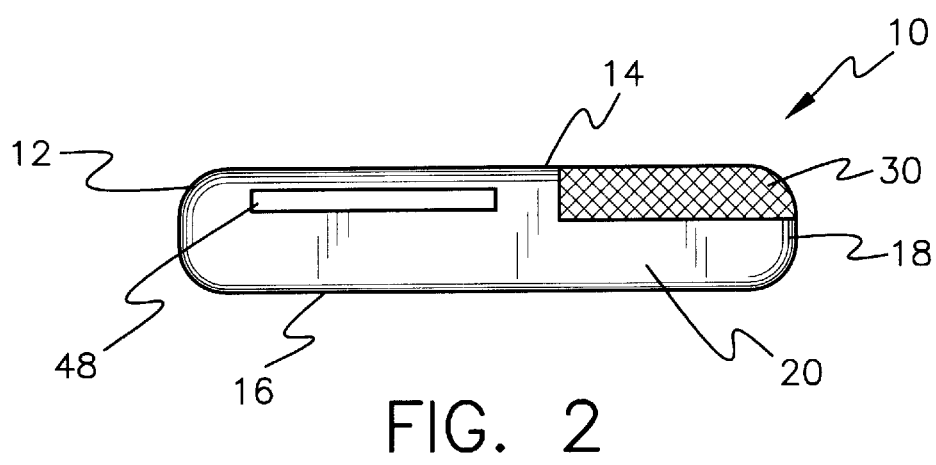
FIG. 2 is a bottom plan view of the present invention.
Figure 3:
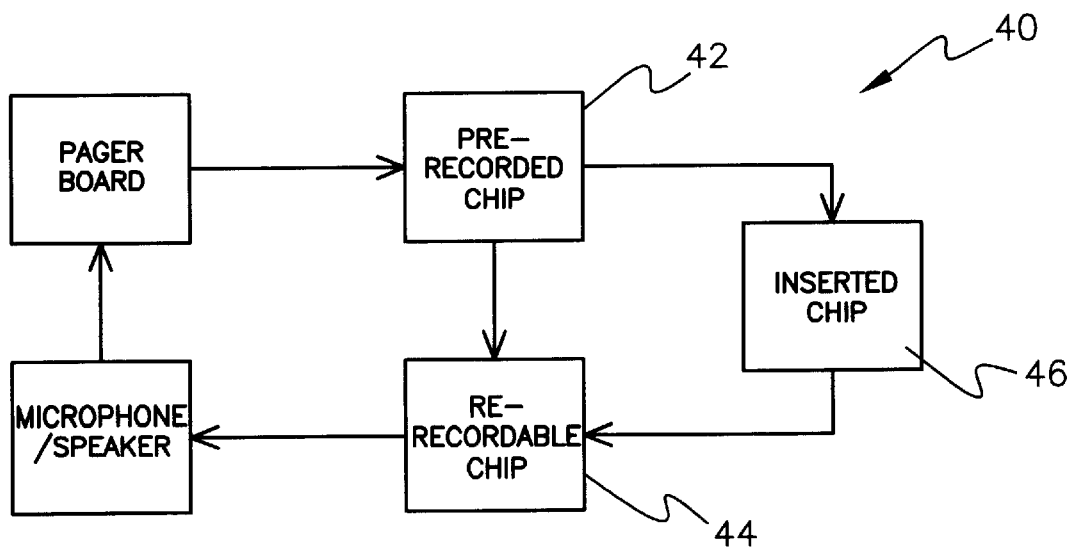
FIG. 3 is a block diagram of a message playback means of the present invention.
Figure 4:
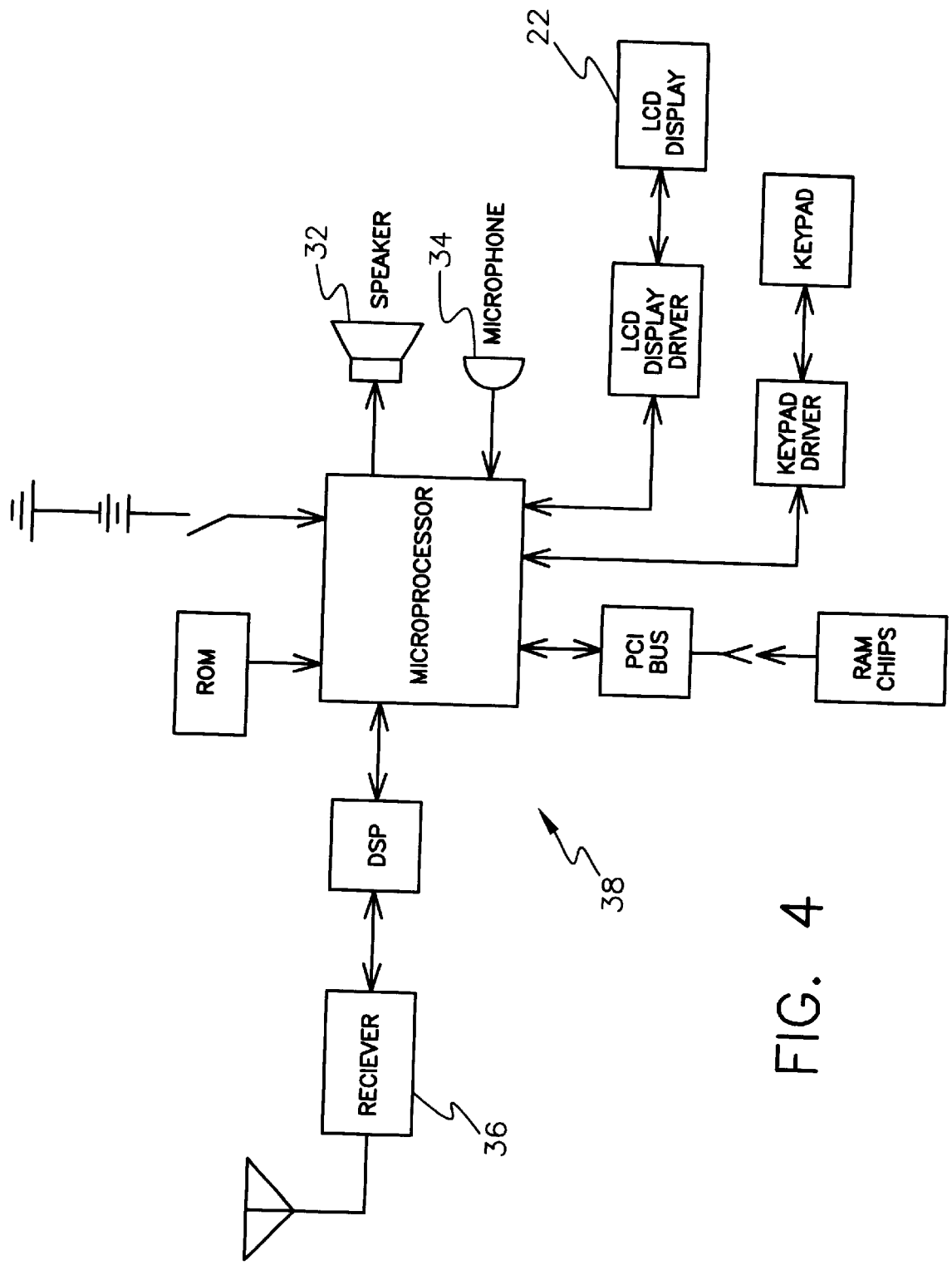
FIG. 4 is a block diagram of the processing means of the present invention.

As shown in FIGS. 1 and 2, an audio housing 30 is coupled to the housing. The audio housing is for protecting a speaker 32 and a microphone 34. The speaker and the microphone are mounted within the interior space of the housing.

A receiving means 36 is operationally coupled to a processing means 38. The receiving means is adapted for receiving a signal from a tower. The receiving means and the processing means are mounted within the interior space of the housing. The processing means is operationally coupled to the display screen such that the processing means is adapted for converting the signal into the visual representation signal and transmitting the visual representation signal to the display screen.

A message playback means 40 is operationally coupled to the processing means. The message playback means is for transmitting a message signal to the processing means upon receipt of the signal from the tower. The speaker is for audibly transmitting the message signal upon transmission of the message signal;

The message playback means includes a static message means 42. The static message means is for providing one of a plurality of pre-recorded messages to the message signal upon the processing means converting the signal. The would be supplied when the pager is purchased and may include such messages as sounds of nature, animals or pre-spoken verbal messages.

The message playback means further includes a recorded message means 44. The recorded message means is operationally coupled to the microphone for recording a plurality of custom messages spoken by the user into the microphone. The recorded message means is for providing one of the custom messages to the message signal upon the processing means converting the signal.

The message playback means also includes an inserted message means 46. The inserted message means is for coupling to a port 48 in the front portion of the peripheral wall of the housing for providing one of a plurality of portable messages to the message signal upon the processing means converting the signal. The inserted message means would be of a type that could be purchased separately from the pager and have a distinctive theme to the messages thereon.

The selection button and the scrolling button are operationally coupled to the message playback means. The selection button and the scrolling button are for selecting the desired message signal by the user.

In use, the user would use the selection and scrolling buttons to page through and select either a pre-recorded message from the static message means, a portable message from the inserted message means, or a custom message recorded by the user on the recorded message means. After selection of the desired message a user would be alerted to that fact that a page has arrived by the audible playing of the selected message.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A custom alert pager for receiving a signal from a tower to alert a user of a request for a contact, the pager comprising:

a housing having a substantially rectangular configuration, said housing having a top surface and a bottom surface, a peripheral wall extending between a periphery of said top surface and a periphery of said bottom surface, said peripheral wall, said top surface and said bottom surface defining an interior space of said housing;

a display screen being coupled to said top surface of said housing, said display screen being for displaying a visual representation signal;

a speaker and a microphone being mounted within said interior space of said housing;

a receiving means being operationally coupled to a processing means, said receiving means being adapted for receiving the signal from the tower, said receiving means and said processing means being mounted within said interior space of said housing, said processing means being operationally coupled to said display screen, said processing means being adapted for converting the signal into said visual representation signal and transmitting said visual representation signal to said display screen;

a message playback means being operationally coupled to said processing means, said message playback means being for transmitting a message signal to said processing means upon receipt of the signal from the tower, said speaker being for audibly transmitting said message signal upon transmission of said message signal;

said message playback means including a static message means, said static message means is for providing one of a plurality of pre-recorded messages to said message signal upon said processing means converting the signal; and said message playback means further including an inserted message means comprises at least one RAM chip which includes a plurality of pre-recorded portable messages, wherein said message playback means further includes a recorded message means, said recorded message means is operationally coupled to said microphone for recording a plurality of custom messages spoken by the user into said microphone, said recorded message means is for providing one of said custom messages to said message signal upon said processing means converting the signal; said inserted message means being selectively inserted into a port in a front portion of said peripheral wall of said housing to be operationally coupled to said processing means for providing one of a plurality of portable messages to said message signal upon said processing means converting the signal.

2. The pager as set forth in claim 1 further comprising a scrolling button being couple to said top surface of said housing such that said scrolling button is positioned proximate said display screen.

3. The pager as set forth in claim 2 further comprising a selection button being coupled to said top surface of said housing such that said selection button is positioned proximate said display screen and said scrolling button.

4. The pager as set forth in claim 3 wherein said selection button and said scrolling button are operationally coupled to said message playback means, said selection button and said scrolling button are for selecting desired said message signal by the user.

5. The pager as set forth in claim 1 further comprising a light button being coupled to said top surface of said housing, said light button being operationally coupled to said display screen such that said display screen being illuminated upon depression of said light button.

6. A custom alert pager for receiving a signal from a tower to alert a user of a request for a contact, the pager comprising:

a housing having a substantially rectangular configuration, said housing having a top surface and a bottom surface, a peripheral wall extending between a periphery of said top surface and a periphery of said bottom surface, said peripheral wall, said top surface and said bottom surface defining an interior space of said housing, said peripheral wall having a front portion and a pair of side portions;

a display screen being coupled to said top surface of said housing, said display screen being for displaying a visual representation signal;

a light button being coupled to said top surface of said housing, said light button being operationally-coupled to said display screen such that said display screen being illuminated upon depression of said light button;

a scrolling button being coupled to said top surface of said housing such that said scrolling button being positioned proximate said display screen;

a selection button being coupled to said top surface of said housing such that said selection button being positioned proximate said display screen and said scrolling button;

an audio housing being coupled to said housing, said audio housing being for protecting a speaker and a microphone, said speaker and said microphone being mounted within said interior space of said housing;

a receiving means being operationally coupled to a processing means, said receiving means being adapted for receiving the signal from the tower, said receiving means and said processing means being mounted within said interior space of said housing, said processing means being operationally coupled to said display screen such that said processing means being adapted for converting the signal into said visual representation signal and transmitting said visual representation signal to said display screen;

a message playback means being operationally coupled to said processing means, said message playback means being for transmitting a message signal to said processing means upon receipt of the signal from the tower, said speaker being for audibly transmitting said message signal upon transmission of said message signal;

said message playback means including a static message means, said static message means being for providing one of a plurality of pre-recorded messages to said message signal upon said processing means converting the signal;

said message playback means including a recorded message means, said recorded message means being operationally coupled to said microphone for recording a plurality of custom messages spoken by the user into said microphone, said recorded message means being for providing one of said custom messages to said message signal upon said processing means converting the signal;

said message playback means further including an inserted message means comprises at least one RAM chip which includes a plurality of pre-recorded portable messages, said inserted message means being selectively inserted into a port in said front portion of said peripheral wall of said housing to be operationally coupled to said processing means for providing one of a plurality of portable messages to said message signal upon said processing means converting the signal; and said selection button and said scrolling button being operationally coupled to said message playback means, said selection button and said scrolling button being for selecting desired said message signal by the user.

\* \* \* \* \*